(12) United States Patent
Kumar

(10) Patent No.: US 9,843,645 B2
(45) Date of Patent: Dec. 12, 2017

(54) SYSTEM AND METHOD FOR PUSHING SMART ALERTS

(71) Applicant: Time Warner Cable Enterprises LLC, New York, NY (US)

(72) Inventor: Naresh Kumar, Stone Ridge, VA (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 241 days.

(21) Appl. No.: 14/069,825

(22) Filed: Nov. 1, 2013

(65) Prior Publication Data
US 2015/0127750 A1   May 7, 2015

(51) Int. Cl.
G06F 15/16 (2006.01)
H04L 29/08 (2006.01)
H04L 29/06 (2006.01)
H04W 12/06 (2009.01)

(52) U.S. Cl.
CPC .......... H04L 67/26 (2013.01); H04L 63/0815 (2013.01); H04W 12/06 (2013.01)

(58) Field of Classification Search
CPC ...... G06Q 10/107; H04L 12/585; H04L 12/58

USPC ........................................................ 709/206
See application file for complete search history.

(56) References Cited

U.S. PATENT DOCUMENTS

2013/0346511 A1* 12/2013 Park ...................... G06Q 10/10
                                                            709/206

OTHER PUBLICATIONS

Apple, Inc., "Local and Push Notification Programming Guide", Apple Developer, pp. 1-58, (Apr. 23, 2013).

* cited by examiner

Primary Examiner — Alan S Chou
(74) Attorney, Agent, or Firm — The Marbury Law Group, PLLC

(57) ABSTRACT

An alert notification is received and evaluated by a processor. An identifier of a subscriber who is registered to receive the first alert notification is identified. The subscriber identifier is used to select assessment rules corresponding to the first alert notification. The assessment rules are applied to the alert notification to determine whether the receipt of the alert notification satisfies a condition for taking one or more actions. If the condition is met, one or more commands are issued to effectuate the one or more actions.

15 Claims, 6 Drawing Sheets

SYSTEM AND METHOD FOR PUSHING SMART ALERTS

BACKGROUND

The introduction of portable computing devices (PCD) such as smartphones, tablets, laptops and similar devices has given rise to the development of applications or "apps" that run on these devices. Apps have been written to play audio and video material, provide news and information, facilitate purchases, and control and/or monitor other devices, among other tasks.

On certain devices, only one application may be active in the foreground at a time. Many applications operate in a time-based or interconnected environment where events of interest to users can occur when the application is not in the foreground. Notifications allow these applications to notify their users when these events occur.

The information provided in a notification may be a message, an impending calendar event, or new data on a remote server. Typically, the notification is displayed as an alert message or an application icon. A notification may also include a sound that accompanies the displayed graphic.

A notification may be local or "pushed" from a remote source. A local notification is local to an application. In a typical architecture, push notifications arrive from outside a device. For example, a push notification may originate on a remote server operated by the application provider and sent by a notification service provider. The notification service provider may be the manufacturer of PCD or a third party who provides the service on behalf of that manufacturer. When presented by the operating system, local and push notifications look and sound the same.

Some providers of PCDs have established stores for selling apps that may be downloaded and operated on their respective branded devices. Apple also provides a notification service to its developers.

A user of PCDs from different vendors may only receive the notifications of a particular vendor's device that are offered by that vendor. That is, a user running two versions on a particular app on PCDs supplied by different vendors must configure each device individually to receive a particular notification. If only one version of the app is capable of supplying a notification, then the user will receive the notification on only one device.

Notifications are typically designed to alert a user of an app that an event associated with an app has taken place. The notification allows the user to activate the app and to interact with the app in light of the event.

SUMMARY

Embodiments herein are directed to systems and methods for using alerts sent to personal computing device as triggering events for selected actions.

In an embodiment, a smart alert couples a triggering event notification with respect to an app with one or more action options. An action option is a user selected action or a set of actions that a user may authorize in response to a triggering event. The action option may involve only the app that is the subject of the triggering event notification or it may involve multiple apps. The selection and execution of an action option may require authorization by the user each time a triggering event notification is delivered or the action option may be pre-selected and authorized by the user such that action is taken when the triggering event is reported.

In an embodiment, the action may be directed to a device that detected the triggering event, or the action may be directed devices other than the device that detected the triggering event.

In an embodiment, an alert notification is received and evaluated by a processor. An identifier of a subscriber who is registered to receive the first alert notification is identified. The subscriber identifier is used to select first assessment rules corresponding to the first alert notification. The first assessment rules are applied to the alert notification to determine whether the receipt of the first alert notification satisfies a condition for taking one or more actions. If the condition is met, one or more commands are issued to effectuate the one or more actions.

In another embodiment, a second alert notification is received and evaluated by the processor. The subscriber identifier is used to select second assessment rules corresponding to the second alert notification. The first and second assessment rules are applied to the first and second alert notifications to determine whether the receipt of the first and second alert notifications satisfies a condition for taking one or more actions. If the condition is met, one or more commands are issued to effectuate the one or more actions.

In an embodiment, a provider of communication services, for example, a broadband service provider, provides smart alerts to its subscribers.

DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments are described in detail with reference to the accompanying drawings. Wherever possible, the same reference numbers are used throughout the drawings to refer to the same or like parts. References made to particular examples and implementations are for illustrative purposes, and are not intended to limit the scope of the invention or the claims.

In an embodiment, a smart alert couples a triggering event notification with respect to an app with one or more action options. An action option is a user selected action or a set of actions that a user may authorize in response to a triggering event. The action option may involve only the app that is the subject of the triggering event notification or it may involve multiple apps. The selection and execution of an action option may require authorization by the user each time a triggering event notification is delivered or the action option may be pre-selected by the user such that action is taken when the triggering event is reported.

The interaction between the participating entities may be provided using one of a number of protocols. By way of illustration and not by way of limitation, interactions may be governed by a long-poll protocol and a websocket protocol. Embodiments may be described and illustrated using a single protocol. However, the reference to a single protocol and the message flows that are used to implement that protocol are not meant to be limiting but are merely illustrative.

Figure 1:
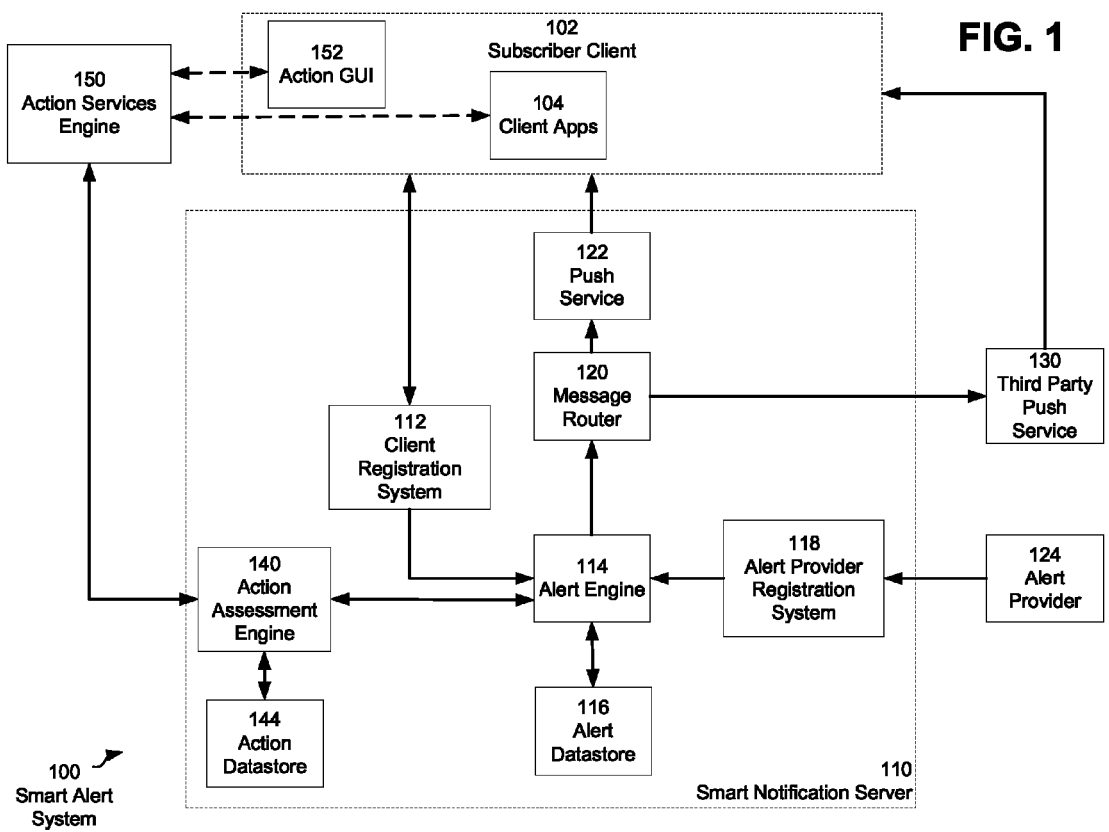
FIG. 1 is a block diagram illustrating an architecture of a smart alert system according to an embodiment.

FIG. 1 is a block diagram illustrating an architecture of a smart alert system 100 according to an embodiment.

In an embodiment, a smart alert system 100 includes a smart notification server 110. In an embodiment, the smart notification server 110 is implemented on a server device such as the server device illustrated in FIG. 5.

The smart notification server 110 includes an alert engine 114 and an action engine 140. A client registration system 112 provides an interface between a subscriber client 102 and the alert engine 114. By way of illustration and not by way of limitation, the subscriber client 102 may be a PC, a tablet, a smart phone, a television or other device that is web-enabled.

The client registration system 112 receives requests for smart alert services from the subscriber client 102. In an embodiment, the client registration system 112 uses a REST API to provide an interface to the subscriber client 102. The client registration system 112 supports a process by which a client, such as subscriber client 102, may register with the alert engine 114 to subscribe to one or more smart alerts. The subscriptions of the subscriber client 102 are saved in an alert datastore 116. As will be described below, the alert datastore 116 may also include information provided by the subscriber client 102 that may used to determine whether the subscriber client 102 is eligible to receive a particular alert. The client registration system 112 may also interact with the subscriber client 102 and the alert engine 114 to unsubscribe to an alert.

Figure 2:
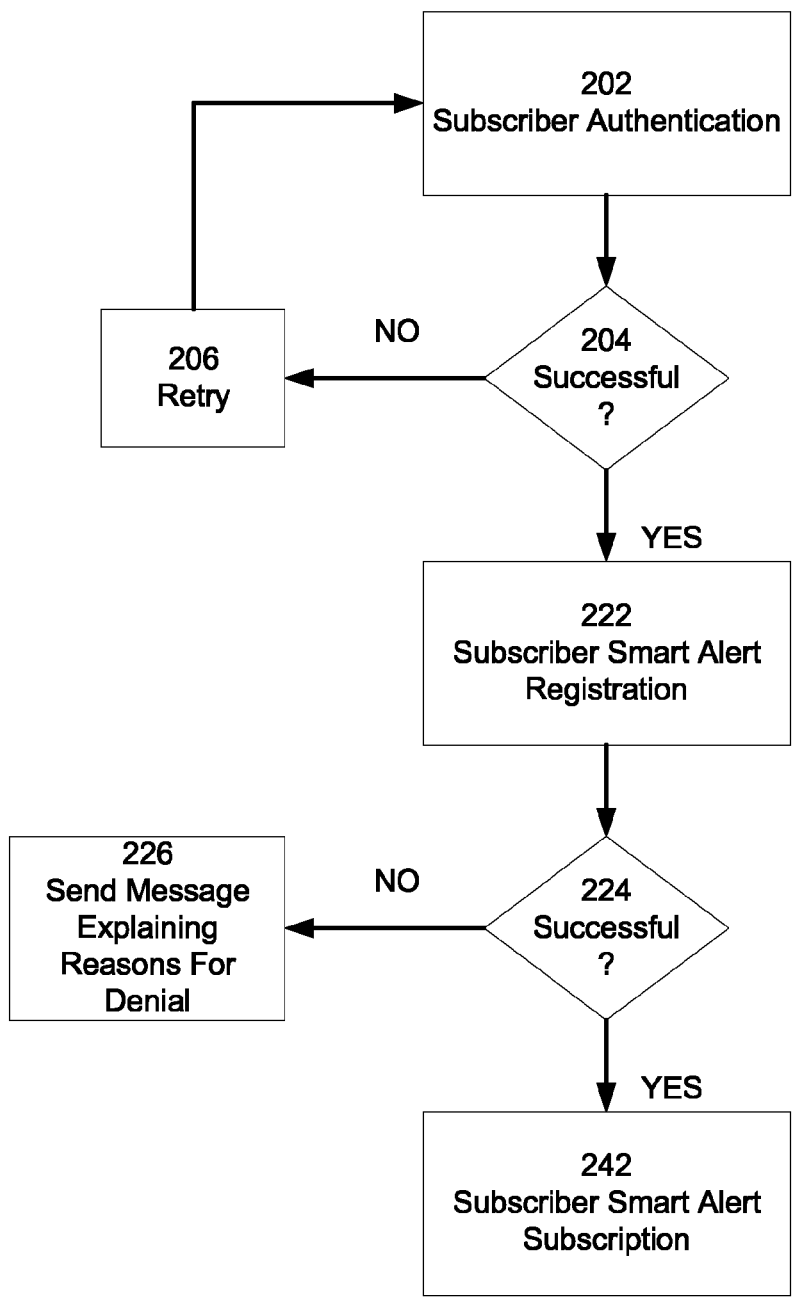
FIG. 2 is a flow diagram illustrating an process by which a subscriber subscribes to smart alerts provided by a service provider according to an embodiment.

In an embodiment, a service provider, for example, a broadband service provider, provides smart alerts to its subscribers. FIG. 2 is a flow diagram illustrating an process by which a subscriber subscribes to smart alerts provided by a service provider according to an embodiment.

A subscriber of the service provider who desires to receive smart notifications is authenticated 202. If the authorization is not successful, that is, if the result of Block 204 is "NO," the subscriber may be asked to resubmit the subscriber's authentication credentials (Block 206). In an embodiment, the authorization credentials represent the subscriber's digital identity, such as for example a user ID and password. In another embodiment, the user is permitted to resubmit the authorization credentials a preset number of times.

In an embodiment, the authentication process utilizes a single sign-on (SSO) process by which a subscriber is authenticated by an identity provider. By way of illustration and not by way of limitation, the SSO process may utilize a Security Assertion Markup Language (SAML) protocol. The SAML protocol was selected for illustrative purposes only and is not intended to be limiting. In this embodiment, the subscriber submits his or her authentication credentials to an identity provider. The identity provider confirms that the authentication credentials are valid and issues a response to the subscriber that includes a identifier, such as a cookie, that can be verified by the service provider. In an embodiment, the identity provider is a service operated by the service provider that allows a subscriber to authenticate with the service provider once in order to access all of the services offered by the service provider, including the smart alert service.

Referring again to FIG. 2, if the subscriber is successfully authenticated, that is, if the result of Block 204 is "YES," the subscriber may attempt to register for smart alert services (Block 222). The subscriber submits a registration request that includes the user name or user id, an identifier associated with the subscriber client 102, such as the subscriber client MAC address, the cookie that is provided to the subscriber client 102 when authentication is successful and a registration id selected by the subscriber, such as an email address.

Conditions may be established for registration with the smart alert system 100. For example, the subscriber may be required to operate at least one app (FIG. 1, Block 104) that is associated with a smart alert action. In addition or alternatively, the subscriber may be required to subscribe to other services provided by the service provider. The client registration system (FIG. 1, Block 112) may access subscriber records to determine whether the subscriber meets the conditions established for registration with the smart alert system 100.

If the conditions for registration are not met by the subscriber, that is, if the result of Block 222 is "NO," the subscriber may be sent a message explaining the reasons for denying registration and steps that may be taken to qualify for registration with the smart alert system 100.

If the conditions for registration are met by the subscriber, that is, if the result of Block 222 is "YES," the subscriber may subscribe for one or more smart alerts. During the registration process, the subscriber client may also provide filter data that may be used by the alert engine 114 to direct smart alerts to particular subscriber clients, including subscriber client 102.

Referring again to FIG. 1, an alert provider registration system 118 provides an interface between an alert provider 124 and the alert engine 114. The alert provider 124 registers with the alert engine 114 to provide alerts to one or more client apps 104 operated by the subscriber client 102. In an embodiment, an alert provide 124 may only register to provide alerts to apps 104 owned or controlled by the alert provider 124.

In an embodiment, an alert provider 124 may establish rules to determine whether the subscriber client 102 is eligible to receive an alert to which the subscriber client 102 has subscribed. The rules that govern the eligibility of the subscriber client to receive an alert may be stored in an alert datastore 116 and implemented by the alert engine 114. An alert that is issued without eligibility rules will be broadcast to all subscriber clients that have registered to receive the particular alert. An alert that is issued with eligibility rules is sent only to subscriber clients that meet the requirements established by the rules.

In an embodiment, alerts that are issued by the alert provider 124 are validated by the alert engine 114 using the alert provider information stored in the alert datastore 116. A validated alert may be further processed by applying the eligibility rules, if any, in the alert datastore 116 for the particular alert to the subscriber data stored in alert datastore 116. If the alert is a broadcast alert, or if the subscriber client 102 is eligible to receive the alert, an alert message is passed to a message router 120.

In an embodiment, the message router 120 may use a push service 122 to convey the alert message to the subscriber client when the subscriber client 102 is a generic device such as personal computer or laptop. By way of illustration and not by way of limitation, push services 122 may utilize a long-poll push service interface and a web-socket push service interface.

The as noted previously, the smart alert system 100 may be configured to filter messages, so services can direct messages to the target clients. Subscriber clients may join with a set of filter parameters. The criteria and parameters together instruct how the filtering operates.

Subscriber clients may have multiple joins. Joins are additive and can contain multiple filter parameters. In an embodiment, there are three defined filter parameters: clientID, ID, and notification type. All other filter parameters are based on the notification type and are dynamic. Clients can dynamically join and unjoin, without changing their subscriptions.

In an embodiment, the smart alert system 100 provides two types of notifications: point-to-point notifications and broadcast notifications. Point-to-point notifications are messages intended for one user identified by the client Id filter parameter. Broadcast notifications are intended for a larger audience. In an embodiment, the broadcast message type may be subject to additional filter parameters that identify a select group of subscribers who are targeted to receive the alert.

In an embodiment, a service provider may also create "system alerts" that are provided to all subscribers including those who have not voluntarily subscribed to receive alerts. A system alert may be issued by the service provider in the form of a point-to-point notification or a broadcast notification to provide information to subscribers or groups of subscribers. The system notification may constitute a triggering event (described below) that triggers an action by one or more client apps 104 operating on the subscriber client 102 (see, FIG. 1). The system alert may initiate an action without the subscriber being aware that an action has occurred.

In the following examples, ZIP codes and FIPS (Federal Information Processing Series) codes are used to indicate a geographic location. Other geographic location codes, such a Geographic Names Information System (GNIS) Identifiers, may be also be used.

By way of illustration and not by way of limitation, the following is a join command for weather alerts with a single zip code as a filter parameter:

https://smart_notification.server/join?clientId=2c93f073370&notificationType=WeatherAlert&zip=66111

By way of illustration and not by way of limitation, the following is a join command for weather alerts with two zip codes as a filter parameters:

https://smart_notification.server/join?clientId=2c93f073370&notificationType=WeatherAlert&zip=66111 &zip=66223

By way of illustration and not by way of limitation, the following is a join command with a wild card zip code:

https://smart_notification.server/join?clientId=2c93f073370&notificationType=WeatherAlert&zip=*

By way of illustration and not by way of limitation, the following is a join command for weather alerts with a zip code and a FIPS as filter parameters:

https://smart_notification.server/join?clientId=2c93f073370&notificationType=WeatherAlert&zip=66223&FIPS=223344

By way of illustration and not by way of limitation, the following is a join command with a wild card zip code and a FIPS as filter parameters:

https://smart_notification.server/join?clientId=2c93f073370&notificationType=WeatherAlert&zip=*&FIPS=223344

By way of illustration and not by way of limitation, the following is a join command with different zip codes and a FIPS as filter parameters:

https://smart_notification.server/join?clientId=2c93f073370&notificationType=WeatherAlert&zip=66223&FIPS=223344
https://smart_notification.server/join?clientId=2c93f073370&notificationType=WeatherAlert&zip=66111&FIPS=556677

In an embodiment, the message filter criteria may be specified with "and" and "or" logic. Multiple filter criteria specified together in the same block (delimited by the "&") must match the filter parameters of the client. Criteria specified in different blocks are evaluated as "or" conditions. In this embodiment, only one block needs to match to have the message delivered.

By way of illustration and not by way of limitation, the following message contains two filter criteria blocks and will be sent to all clients having a filter parameter of "zip=66111" and all the clients having a filter parameter of "FIPS=223344":

```
<SmartAlertMessage>
    <Header>
        ...
        <Publish mode="ALL">
            <Filter value="FIPS=223344"/>
            <Filter value="ZIP=66111"/>
        </Publish>
    </Header>
    <Body>
        ...
    </Body>
</SmartAlertMessage>
```

By way of illustration and not by way of limitation, the following message contains a single criteria block and will be sent to all client with the both filter parameters "zip=66111" and "FIPS=223344" in the same join:

```
<SmartAlertMessage>
    <Header>
        ...
        <Publish mode="ALL">
            <Filter value="FIPS=223344&ZIP=66111"/>
        </Publish>
    </Header>
    <Body>
        ...
    </Body>
</SmartAlertMessage>
```

Figure 3:
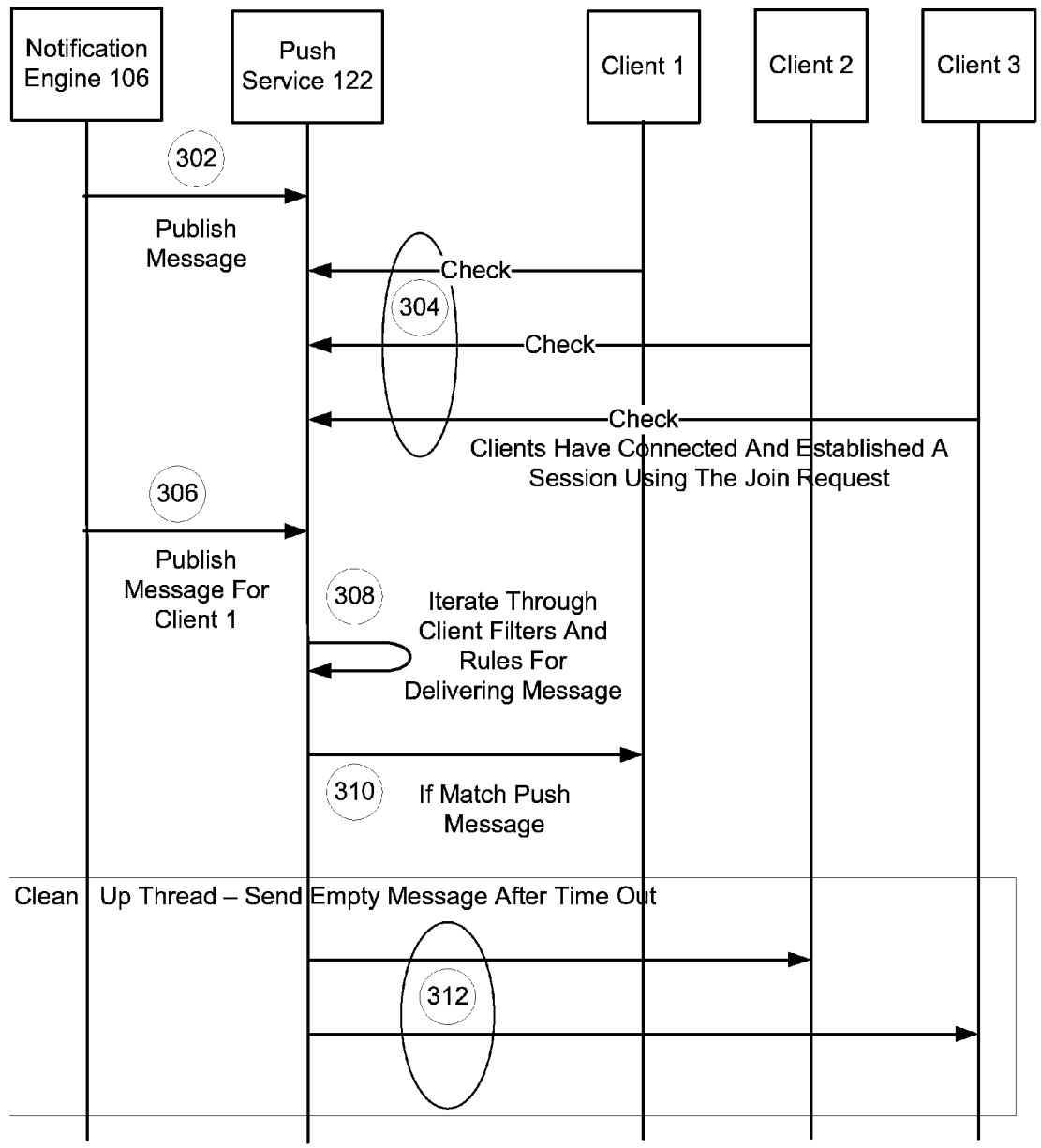
FIG. 3 is a flow diagram of an interaction between an alert engine, a push service and a plurality of subscriber clients according to an embodiment.

FIG. 3 is a flow diagram of an interaction between an alert engine 114, a push service 122, and a plurality of subscriber clients (clients 1, 2, and 3) according to an embodiment.

Any service in the network will publish the notification to the alert engine. The alert engine will publish the notification to the push service (FIG. 3, Circle 302).

In an embodiment, clients 1, 2 and 3 check the push service 122 for messages (FIG. 3, Circle 304). Client 1 is identified as eligible for a smart alert message (FIG. 3, Circle 306). The filters associated with the smart alert and the filter parameters included in the join message (FIG. 3, Circle 304) are compared to determine whether client 1 meets the requirements for receiving the message (FIG. 3, Circle 308). The client 1 meets the requirements for receiving the message, the message is pushed to client 1 (FIG. 3, Circle 310).

As illustrated in FIG. 3, neither client 2 nor client 3 is entitled to receive a message. The thread may be cleaned up by sending a time out message to clients 2 and 3, which message has no payload (FIG. 3, Circle 312).

Alternatively, when the subscriber client is subject to restrictions by the client manufacturer or distributor, the message router 120 may send alert messages to a third party push service 130, which service is entitled to communicate alerts to the subscriber client 102.

Figure 4:
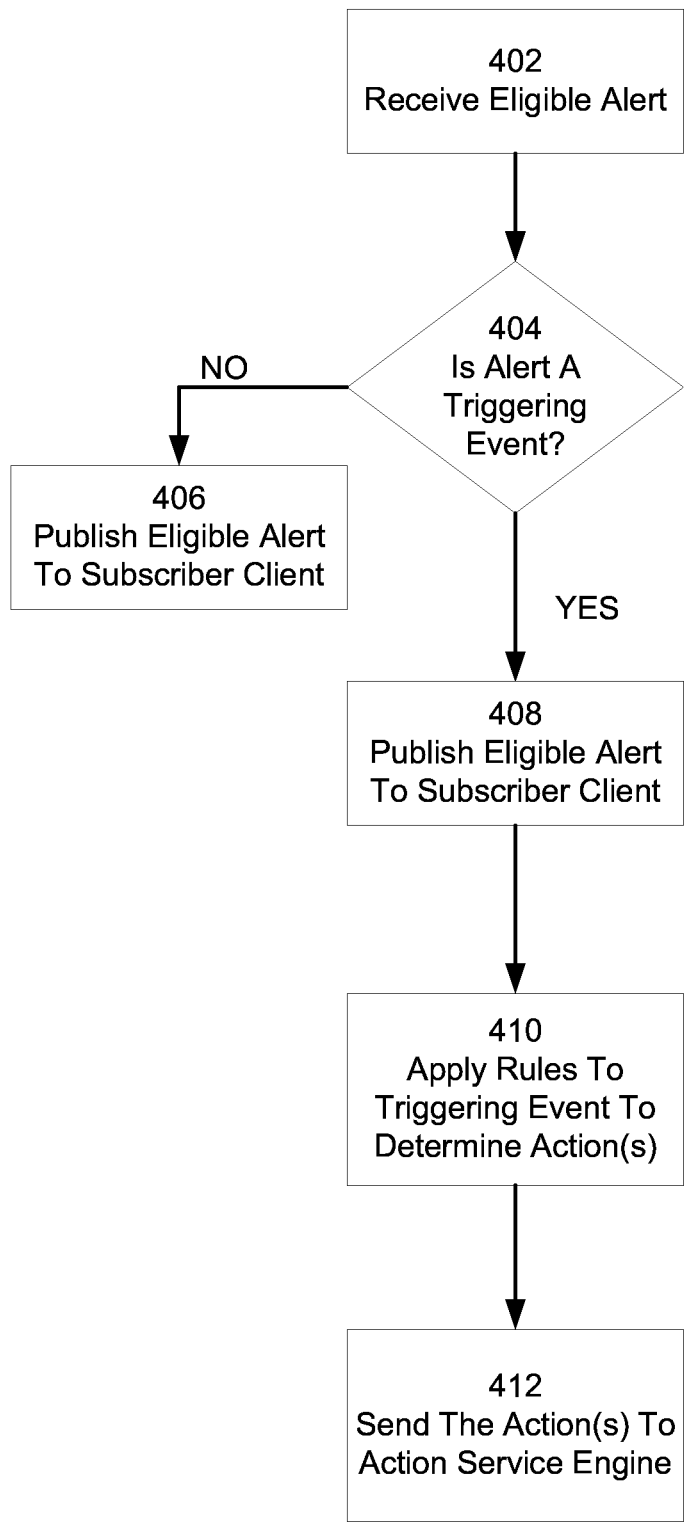
FIG. 4 is a flow diagram illustrating a process by which an alert is evaluated to determine if it qualifies as a triggering event according to an embodiment.

FIG. 4 is a flow diagram illustrating a process by which an alert is evaluated to determine if it qualifies as a triggering event according to an embodiment. Referring to FIG. 1 and to FIG. 4, in an embodiment, alerts for which the client subscriber 102 has subscribed and, if applicable, eligible to receive are communicated by the alert engine 114 and communicated to an action assessment engine 140 (FIG. 4, Block 402). The action assessment engine 140 evaluates the alert to determine if the alert message is associated with action rules that are stored in an action datastore 144 (FIG. 4, Block 404). An alert that is associated with action rules may sometimes be referred to herein as a "triggering event." If the alert does not qualify as a "triggering event," that is, if the result of Block 404 is "NO," the eligible alert is published to the subscriber client 102. If the alert qualifies as a "triggering event," that is, if the result of Block 404 is "YES," the eligible alert is published to the subscriber client 102 (FIG. 4, Block 408), and the action assessment engine 140 applies the action rules to the action data to determine what action or actions should be taken in response to the particular event (FIG. 4, Block 410). The action assessment engine 140 conveys the results of the action rules to an action service engine 150 which executes the results from the action assessment engine 140 (FIG. 4, Block 412).

In an embodiment the action assessment engine 140 issues commands that are recognized by devices or applications that are to be controlled. By way of illustration and not by way of limitation, a controlled device may include a thermostat, a door, a window, a shutter, a pump, a lighting device, a communication device, a signaling device, a cooking device, a vehicle, a security device.

The action datastore 144 also includes action data provided by the subscriber client 102 during registration with the alert engine 114.

In an embodiment, a triggering event may include any observable or detectable occurrence. Without limiting the foregoing, a triggering event may be the arrival of a point in time or a date, a weather condition, a change in state of a sensor, the presence of a person or thing at a location, the movement of a person or thing, the absence of a person or thing from a location, a news worthy occurrence, a result of a contest and a change in value of a property. The reporting of the triggering event may trigger any response that may be implemented by the subscriber client 102, either via one or more apps operating on the subscriber client or via an Action GUI 152 that provides the subscriber client 102 access to action services.

By way of illustration and not by way of limitation, a response may include actions such as, for example, the one or more actions are selected from the group consisting of actuating a controller, dialing a phone number, consummating a financial transaction, arming or disarming a security system, moving a camera, controlling a light or lighting system, and turning on or off a device.

To further illustrate the operation of the smart alert system 100, a embodiment in which an alert provider 124 monitors a presence detection device at a dwelling will be described.

A presence detector, such as, for example, a camera, detects the presence of person at a location proximate to a dwelling, such as, for example a front door. The alert provider 124 receives a signal or message indicative of the presence of the individual and generates an alert that is sent to the alert engine 114. In addition to processing the alert for delivery to the subscriber client 102, the alert engine 114 provides the alert to the action assessment engine 140. The action assessment engine 140 refers to the action database 144 to determine whether the alert constitutes an "event" associated with at least one action. If the alert constitutes a triggering event associated with at least one action, then the action or actions are sent to the action services engine 150 for processing.

By way of illustration and not by way of limitation, the presence of the individual is a triggering event that may be associated with at least one action including:

playing a message audible to the individual instructing the individual to identify himself or herself to a security system;
  identifying the individual using facial recognition software;
  opening a door to the dwelling when the individual is known; and
  calling a security service or the police when the individual is not known.

Triggering events may be cumulative. For example, in the embodiment described above, the presence of a person is detected in proximity to a dwelling, and a weather condition is detected for the area in which the dwelling is located. The action taken with respect to the presence of the individual may be affected by the issuance of a weather alert. For example, if an alert is issued for stormy weather, the action may include opening the door if the person is known, securing the door if the person is not known, turning on the lights, instructing the person to remain in an area proximate to the door inside the dwelling and disengaging a security system for that area. If an alert regarding the weather has not been issued, then the action may include instructing the individual to remain outside the dwelling.

A subscriber may relate actions and triggering events according the subscriber's needs and preferences. For example, a subscriber may relate a weather event and a product announcement to a financial action:

the government issues a negative corn crop outlook;
  a fast food chain announces a new product that uses corn; and
  the smart alert system 100 purchases corn futures for the subscriber.

As describe above, the action services engine 150 may provide commands to a client app 104 to implement an action without involvement of the subscriber or it may send provide optional actions to an action graphical user interface (GUI) 152 displayed on the subscriber client 102, which options may be selected by the user of the subscriber client 102.

Figure 5:
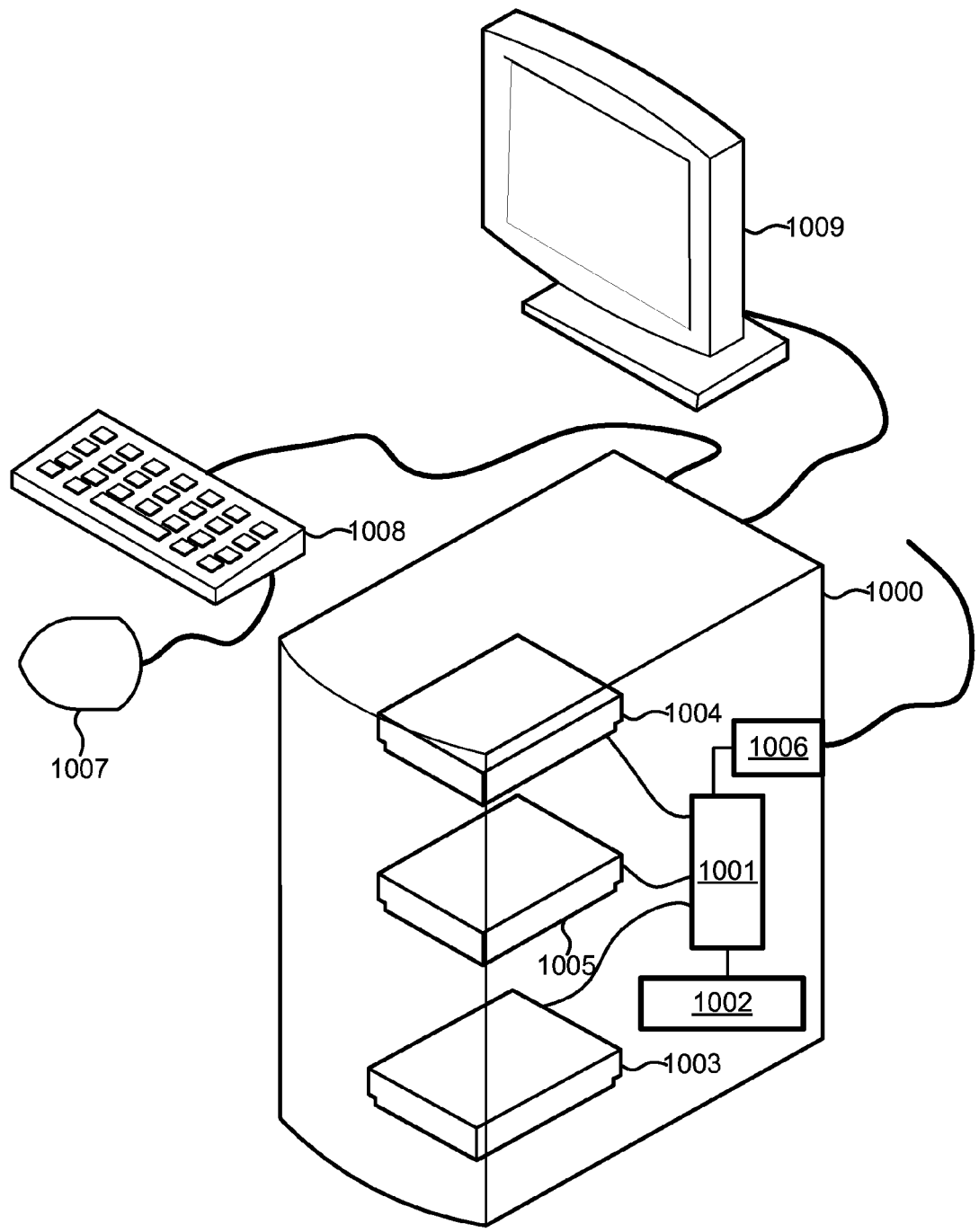
FIG. 5 is a block diagram of a computing device suitable for use with any of the embodiments.

FIG. 5 is a block diagram of a computing device suitable for use with any of the embodiments. Such a computing device 1000 typically includes a processor 1001 coupled to volatile memory 1002 and a large capacity nonvolatile memory, such as a disk or solid-state flash drive 1003. Typically, software applications may be stored in the internal memory 1002 before they are accessed and loaded into the processor 1001. The processor 1001 may include internal memory sufficient to store the application software instructions.

The computing device 1000 may also include a flash drive 1004 and a compact disc (CD) drive 1005 coupled to the processor 1001. Typically, the computing device 1000 will also include a pointing device such as a mouse 1007, a user input device such as a keyboard 1008 and a display 1009. The computing device 1000 may also include a number of connector ports 1006 coupled to the processor 1001 for establishing data connections or network connections (wired or wireless) or for receiving external memory devices, such as USB or FireWire® connector sockets. In a notebook or tablet configuration, the computer housing includes the pointing device 1007, keyboard 1008 and the display 1009 as is well known in the computer arts.

While the computing device 1000 is illustrated as using a desktop form factor, the illustrated form is not meant to be limiting. For example, some or all of the components of computing device 1000 may be implemented as a desktop computer, a laptop computer, a mini-computer, a tablet, a smart phone or a personal data assistant.

Figure 6:
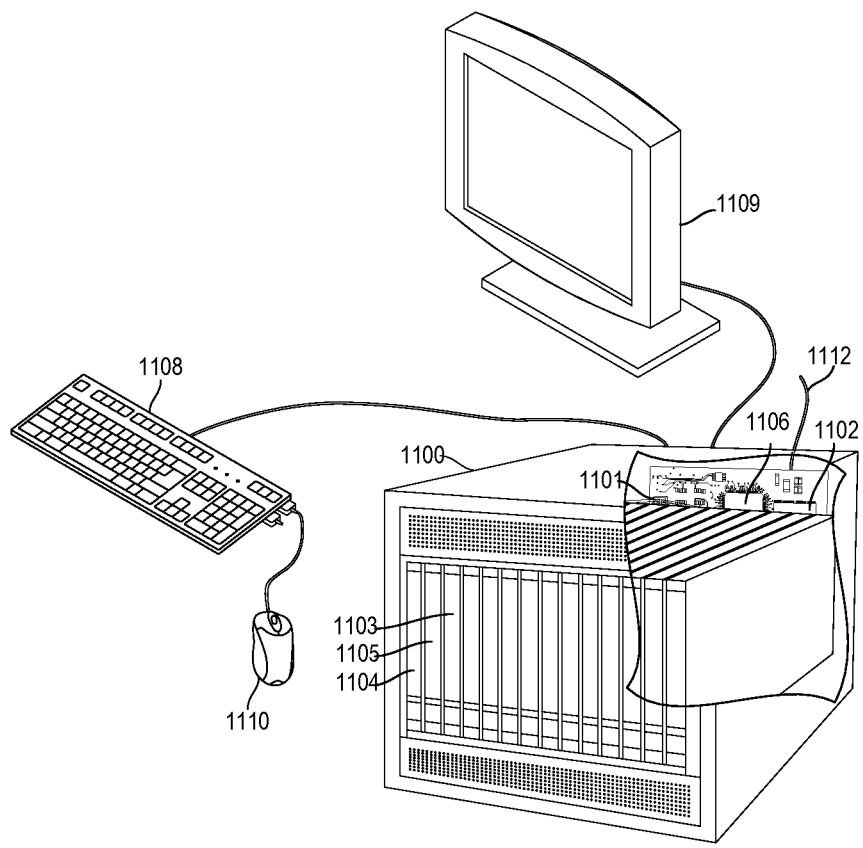
FIG. 6 is a block diagram of a server device suitable for use with any of the embodiments.

The smart notification server 110, including the alert engine 114, the action assessment engine 140 and the action services engine 150 may also be implemented on any of a variety of commercially available server devices, such as the server 1100 illustrated in FIG. 6. Such a server 1100 typically includes a processor 1101 coupled to volatile memory 1102 and a large capacity nonvolatile memory, such as a disk drive 1103. The server 1100 may also include an external drive, compact disc (CD) or DVD disc drive 1104 coupled to the processor 1101. The server 1100 may also include network access ports 1106 coupled to the processor 1101 for establishing data connections with a network 1112 (wired or wireless), such as a local area network coupled to other broadcast system computers and servers. Servers 1100 may also include operator interfaces, such as a keyboard 1108, pointer device (e.g., a computer mouse 1110), and a display 1109.

The processors 1001 and 1101 may be any programmable microprocessor, microcomputer or multiple processor chip or chips that can be configured by software instructions (applications) to perform a variety of functions, including the functions of the various embodiments described below. In some mobile receiver devices, multiple processors may be provided, such as one processor dedicated to wireless communication functions and one processor dedicated to running other applications. Typically, software applications may be stored in the internal memory 1002, 1102, and or 1103 before they are accessed and loaded into the processors 1001 and 1101. The processors 1001 and 1101 may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. An apparatus comprising:
an interface for receiving a plurality of alert notifications; and
at least one processor configured with processor-executable instructions to perform operations comprising:
receiving the plurality of alert notifications from a plurality of alert providers, wherein each of the plurality of alert notifications is associated with a respective action, and wherein the plurality of alert providers are registered with the apparatus;
determining whether each of the plurality of alert notifications includes a subscriber eligibility rule;
identifying one or more subscribers registered to receive each of the plurality of alert notifications based on provider rules when an alert notification omits a subscriber eligibility rule;
identifying one or more subscribers registered to receive each of the plurality of alert notifications based on the provider rules and the subscriber eligibility rule included in the alert notification;
selecting alert assessment rules associated with each of the plurality of alert notifications;
determining whether receipt of each of the plurality of alert notifications by the one or more subscribers satisfies the selected alert assessment rules to establish a respective triggering event;
providing the plurality of alert notifications to each of the one or more identified subscribers through a notification service interface using one of a push service or a pull service; and issuing a command to effectuate the respective action by a controlled device belonging to each of the one or more subscribers associated with the selected alert assessment rules, wherein issuing the command to effectuate the respective action is issued based on establishment of the respective triggering event.

2. The apparatus claim 1, wherein at least one of the plurality of alert notifications is selected from a group consisting of a weather condition at a location, an arrival of a point in time, a current or future data, a change in state of a sensor, a presence of a person or thing at a location, a movement of a person or thing, an absence of a person or thing from a location, a news worthy occurrence, a result of a contest and a change in value of a property.

3. The apparatus of claim 1, wherein the respective action is selected from a group consisting of actuating a controller, dialing a phone number, consummating a financial transaction, arming or disarming a security system, moving a camera, controlling a light or lighting system, and turning on or off a device.

4. The apparatus of claim 1, wherein the controlled device is selected from a group consisting of a thermostat, a door, a window, a shutter, a pump, a lighting device, a communication device, a signaling device, a cooking device, a vehicle, a security device.

5. The apparatus of claim 1, wherein the issuing of the command comprises issuing the command to an application operating on a computing device.

6. The apparatus of claim 1, wherein issuing the command comprises issuing the command to the controlled device.

7. A method for managing a plurality of alert notifications, the method comprising:
receiving, by a notification processing device, the plurality of alert notifications from a plurality of alert providers, wherein each of the plurality of alert notifications is associated a respective action, and wherein the plurality of alert providers are registered with the notification processing device;
determining, by the notification processing device whether each of the plurality of alert notifications includes a subscriber eligibility rule;
identifying, by the notification processing device, one or more subscribers registered to receive each of the plurality of alert notifications based on provider rules when an alert notification omits a subscriber eligibility rule;
identifying, by the notification processing device, one or more subscribers registered to receive each of the plurality of alert notifications based on the provider rules and the subscriber eligibility rule included in the alert notification;
selecting, by the notification processing device, alert assessment rules associated with each of the plurality of alert notifications;
determining whether receipt of each of the plurality of alert notifications by the one or more subscribers satisfies the selected alert assessment rules to establish a respective triggering event;
providing, by the notification processing device, the plurality of alert notifications to each of the one or more identified subscribers through a notification service interface using one of a push service or a pull service; and
issuing, by the notification processing device, a command to effectuate the respective action by a controlled device belonging to each of the one or more subscribers associated with the selected alert assessment rules, wherein issuing the command to effectuate the respective action is issued based on establishment of the respective triggering event.

8. The method of claim 7, wherein at least one of the plurality of alert notifications is selected from a group consisting of a weather condition at a location, an arrival of a point in time, a current or future data, a change in state of a sensor, a presence of a person or thing at a location, a movement of a person or thing, an absence of a person or thing from a location, a news worthy occurrence, a result of a contest and a change in value of a property.

9. The method of claim 7, wherein the respective action is selected from a group consisting of actuating a controller, dialing a phone number, consummating a financial transaction, arming or disarming a security system, moving a camera, controlling a light or lighting system, and turning on or off a device.

10. The method of claim 7, wherein the controlled device is selected from a group consisting of a thermostat, a door, a window, a shutter, a pump, a lighting device, a communication device, a signaling device, a cooking device, a vehicle, a security device.

11. The method of claim 7, wherein the issuing of the command comprises issuing the command to an application operating on a computing device.

12. The method of claim 7, wherein issuing the command comprises issuing the command to the controlled device.

13. A method of communicating an alert notification, the method comprising:
receiving, by a notification server, an alert notification from an alert provider;
determining, by the notification server, whether the alert notification includes a subscriber eligibility rule;
identifying, by the notification server, a target subscriber corresponding to the alert notification based on information associated with the target subscriber stored at the notification server and alert provider information stored at the notification server in response to determining that the alert notification omits a subscriber eligibility rule;
identifying, by the notification server, the target subscriber corresponding to the alert notification based on the subscriber eligibility rule, the information associated with the target subscriber stored at the notification server, and the alert provider information stored at the notification server including one or more provider rules; and
publishing the alert notification to the identified target subscriber.

14. The method of claim 13, further comprising:
forwarding the alert notification to an action assessment engine of the notification server after the target subscriber is identified;
determining, by the action assessment engine, whether the alert notification is a triggering event based on an action rule stored at the notification server;
determining, by the action assessment engine, an action command to transmit to the target subscriber when the alert notification is determined to be the triggering event; and
transmitting the action command to a device associated with the identified target subscriber when the alert notification is determined to be the triggering event.

15. The method of claim 14, wherein the determining of whether the alert notification is the triggering event is further based on the information associated with the target subscriber stored at the notification server.

\* \* \* \* \*